United States Patent [19]

Wesson

[11] Patent Number: 4,498,348
[45] Date of Patent: Feb. 12, 1985

[54] PHOTOELASTIC SENSING DEVICE

[75] Inventor: Laurence N. Wesson, Collegeville, Pa.

[73] Assignee: TRW Inc., Redondo Beach, Calif.

[21] Appl. No.: 503,429

[22] Filed: Jun. 13, 1983

[51] Int. Cl.$^3$ .............................................. G01L 5/16
[52] U.S. Cl. ................................ 73/862.05; 73/189; 73/517 R; 356/33
[58] Field of Search ............... 73/517 R, 800, 862.38, 73/862.04, 862.05, 862.06, 189; 350/371; 356/371

[56] References Cited

U.S. PATENT DOCUMENTS 3,096,388  7/1963  Davenport ..................... 73/800 X
3,950,987  4/1976  Slezinger et al. ............... 73/862.64
4,010,632  3/1977  Slezinger et al. ............... 73/862.38

OTHER PUBLICATIONS

M. M. Frocht, "Photoelasticity", vol. II, pp. 333–337, John Wiley & Sons, Inc., 1948.
M. Born et al, "Principles of Optics", Fifth Ed., Pergamon Press, pp. 703–705, 1975.
P. S. Theocaris et al, VDI Bericute NR 313, pp. 599–605, 1978.

Primary Examiner—Charles A. Ruehl
Attorney, Agent, or Firm—Jacob Trachtman; John T. Wiedemann

[57] ABSTRACT

A photoelastic sensing device comprising a photoelastic member of transparent material, first means for supplying polarized light fluxes to the member for transmission therethrough along a plurality of respective paths, and second means for receiving and detecting the transmitted light fluxes. A third means applies stresses to the member in response to the application thereto of force which is variable and has a magnitude and direction represented by its components along a plurality of vector coordinates which define a space of at least two dimensions. The light fluxes which are transmitted respectively along the plurality of paths of the member are each responsive to the stresses in the member along its path, and the second means provides an output signal which is responsive to the force and to each of the components of the force applied to the third means. The output signal is representative of and provides a measure and indication of the force and each of its components applied to the sensing device, and is responsive to the magnitude and direction of the applied force for providing control means.

51 Claims, 14 Drawing Figures

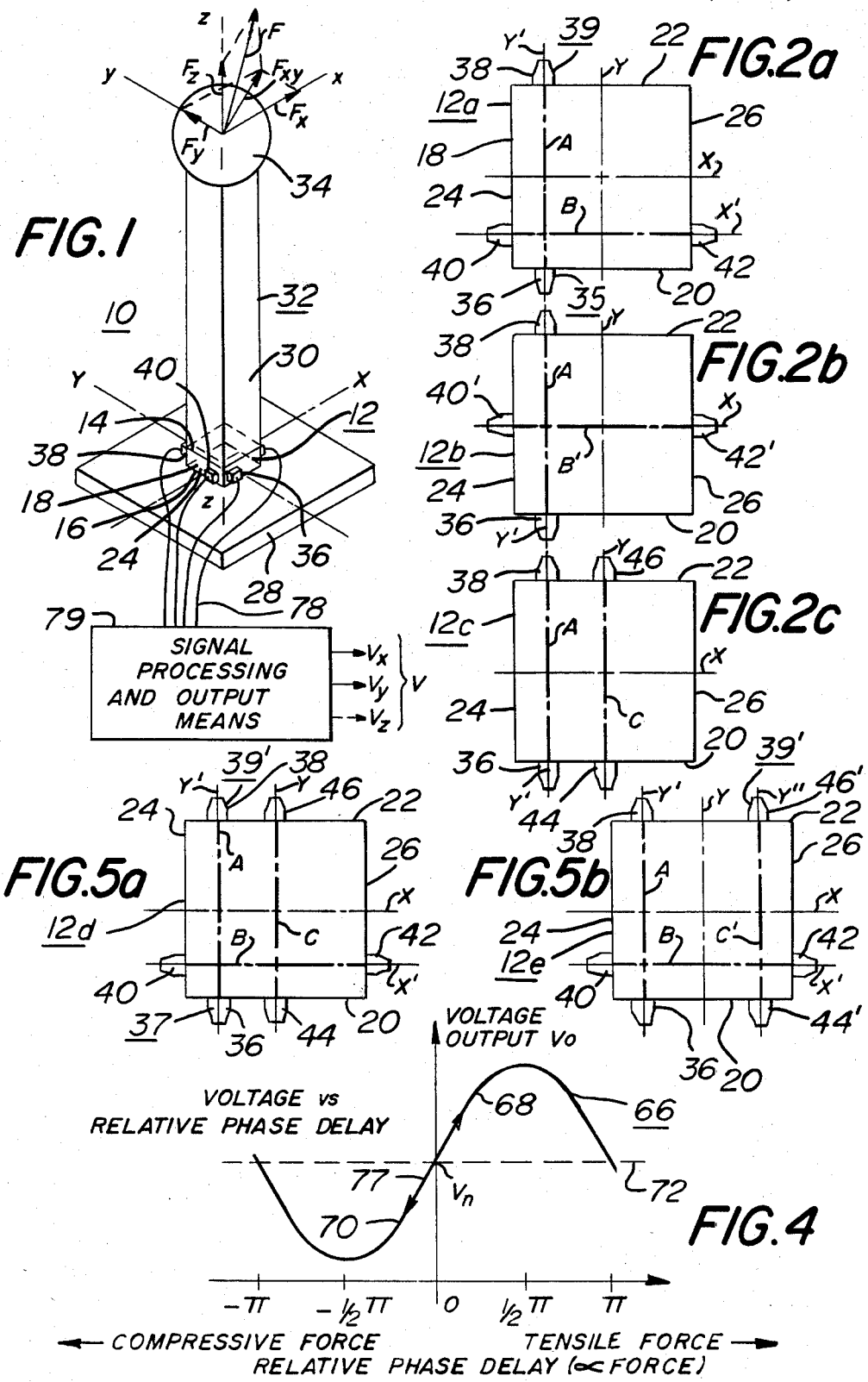

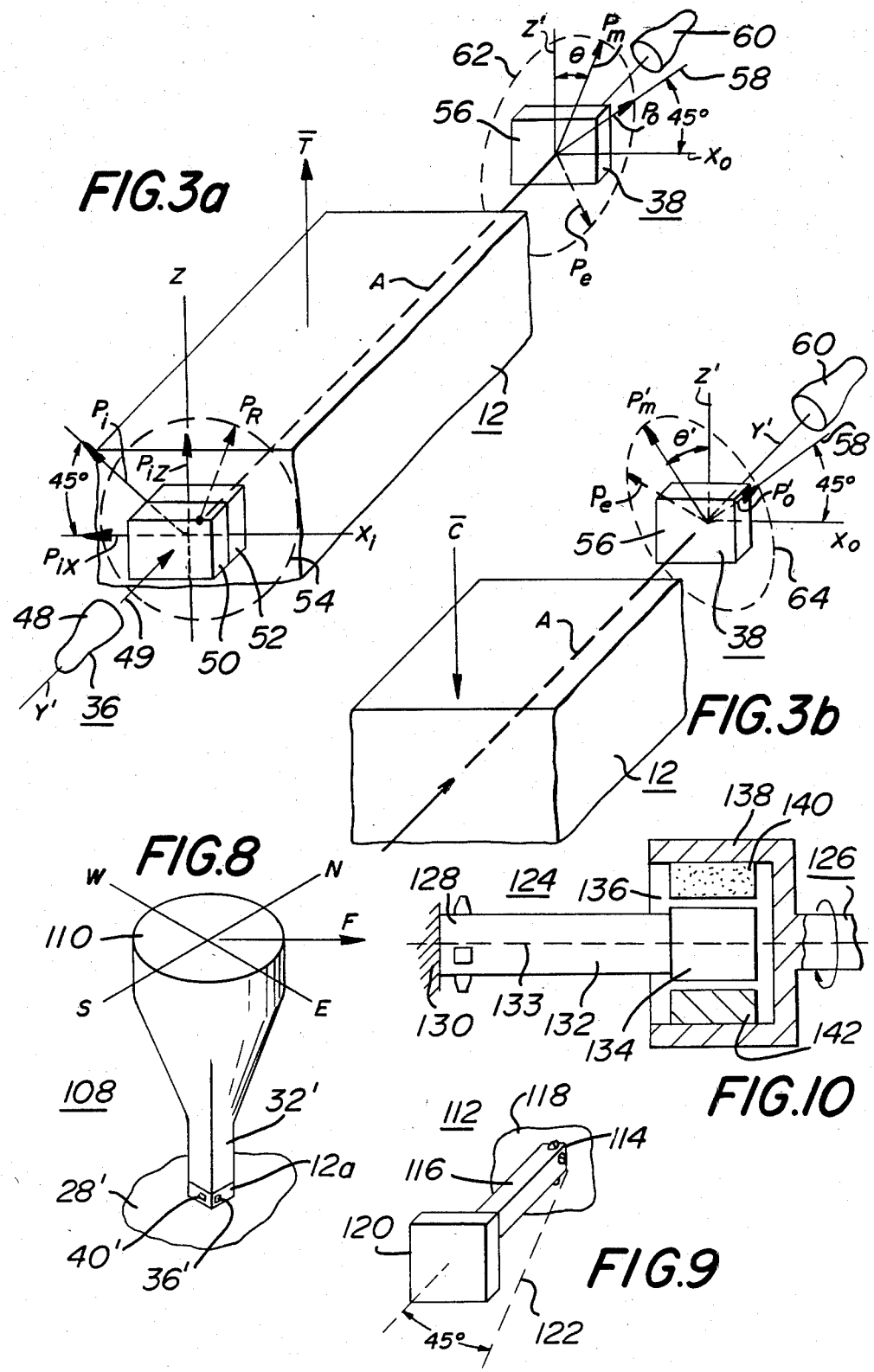

PHOTOELASTIC SENSING DEVICE

The invention relates to a photoelastic sensing device, and more particularly to a photoelastic device for sensing the magnitude and direction of a force applied thereto and providing an output signal which is representative of and responsive to the magnitude and direction of the applied force.

BACKGROUND OF THE INVENTION

Heretofore, control means have utilized manual actuation of levers to move mechanical connecting means or linkages for controlling remotely located devices. Control by such physical means is practical only over limited distances and such means are also subject to friction, wear and inertia. In contrast, electrical control systems offer many advantages, including the utilization of frictionless, compact and low power means, for providing almost instantaneous action and effective control at remote locations. At present, electrical strain gauges are commonly used for sensing and measuring force, and the semiconductor and bonded metal foil types are widely used for sensing shaft torques. A major disadvantage of using such strain gauges, however, is that they require high amplification and signal conditioning at the sensor location, making them susceptible to noise interference. Thus, their use in environments of high electromagnetic interference, as in the presence of heavy machinery, results in noise being induced in their electrical transmission lines, which greatly reduces their effectiveness. The use of electrical signal transmission lines is also undesirable where such lines are routed through explosive or otherwise hazardous environments. The use of optical fibers for conveying light signals avoids such dangers. Photoelastic sensing systems, such as described in U.S. Pat. No. 3,950,987, have been utilized for providing output signals responsive to the application of force. Such systems, however, have been limited to sensing forces in one dimension and are not responsive to applied force having vector coordinates in two or more dimensions. Such photoelastic systems, therefore, have the disadvantage of not being capable of providing an output signal which is responsive to each of the vector components of the applied multi dimensional force for providing control means, and also for providing a measure and indication of the vector force applied to the sensing system.

SUMMARY OF THE INVENTION

It is, therefore, a principal object of the invention to provide a new and improved photoelastic sensing device.

Another object of the invention is to provide a new and improved photoelastic sensing device utilizing the photoelastic effect for providing output signals responsive to applied force.

Another object of the invention is to provide a new and improved photoelastic sensing device which is responsive to the application of a variable force having components in a space of at least a two dimensions for providing an output signal which is representative of the applied force and responsive to each of its components.

Another object of the invention is to provide a new and improved photoelastic sensing device which may be manually actuated for providing a plurality of coordinated control signals for operating various devices including vehicles, aircraft, machinery, games, information input systems, and other such means.

Another object of the invention is to provide a new and improved photoelastic sensing device for sensing force which provides an output signal which is representative of an applied force for providing a measure and an indication of the force applied thereto.

Another object of the invention is to provide a new and improved photoelastic device for sensing force which requires only minimum movement of its force receiving components for providing an output signal responsive to an applied force.

Another object of the invention is to provide a new and improved photoelastic sensing device which is suitable for use under adverse environmental conditions including extremely high temperatures.

Another object of the invention is to provide a new and improved photoelastic sensing device which is useful in fiber optical systems.

Another object of the invention is to provide a new and improved photoelastic sensing device which utilizes an optical path which is closed and impervious to dirt and foreign matter.

Another object of the invention is to provide a new and improved photoelastic sensing device which may be readily adapted for various design requirements and applications.

Another object of the invention is to provide a new and improved photoelastic sensing device which is simple and rugged in construction, is highly reliable in operation, and requires minimum maintenance.

Another object of the invention is to provide a new and improved photoelastic sensing device which may be easily fabricated, utilizes inexpensive materials and components, and can be produced at a relatively low cost.

The above objects as well as many other objects and advantages of the invention are provided by a photoelastic sensing device comprising a photoelastic member of transparent material, provided with first means for supplying polarized light fluxes to the member for transmission therethrough along a plurality of respective paths, and second means for receiving and detecting the transmitted light fluxes. A third means applies stresses to the member in response to the application thereto of a force which is variable and has a magnitude and direction represented by its components along a plurality of vector coordinates which define a space of at least two dimensions. The light fluxes which are transmitted respectively along the plurality of paths of the member are each responsive to the stresses in the member along its path, and the second means provides an output signal which is responsive to the force and to each of the components of the force applied to the third means. The output signal is representative of and provides a measure and indication of the force and each of its components applied to the sensing device, and is responsive to the magnitude and direction of the applied force for providing control means.

Where the photoelastic device is provided for sensing force having components in only a two dimensional space, first and second paths are utilized for transmitting the light fluxes through the photoelastic member. The light flux transmitted along the first path is responsive to the magnitude of the component of force applied to the third means in the direction of a first coordinate of the space, while the light flux transmitted along the second path is responsive to the magnitude of the component of the force applied in the direction of its second coordinate. In one arrangement, the first path is in the direction transverse to the first coordinate, while the second path is in a direction transverse to the direction of the second coordinate, and the output signal of the second means is responsive to the magnitude and direction of the applied force. In another arrangement, the light flux transmitted along the first path is responsive to the magnitude of the component of the force applied in the direction of the first coordinate, while the light fluxes transmitted along the first and second paths are both responsive in the same sense to the magnitude of the component of the force applied in the direction of the second coordinate. In this case, the directions of the first and second paths are each transverse to the direction of the first coordinate and also to the direction of the second coordinate, and the output signal of the second means is similarly responsive to the magnitude and direction of the applied force.

The third means of the sensing device may have the form of an elongated member or control stick with a first end for receiving the applied force and a second end for applying bending stresses and compressive and tensile stresses to the photoelastic member. The bending stresses comprise concurrent compressive and tensile stresses at different locations directed transverse to the first and second paths for affecting the polarizations of the light fluxes transmitted by the member.

The photoelastic member may be provided with a peripheral surface having parallel, oppositely spaced portions for providing first and second opposite regions. The first means provides light fluxes to the peripheral surface of the member at respective first regions for the transmission through the member along the first and second paths to respective second regions of the peripheral surface. The first means includes polarizing means providing polarized light fluxes having rectangular vector components which are respectively parallel and perpendicular to the direction of the transverse stresses produced in the member. Detecting means of the second means receives the transmitted light fluxes at the second regions of the peripheral surface of the member and detects the light fluxes received for providing a detected signal for each path responsive to the polarization of the light fluxes respectively transmitted thereby. The detected signals may be delivered to a signal processing and output means of the second means for providing an output signal which is representative of the applied force and responsive to the components of the force which is applied to the third means.

Where the photoelastic device is provided for sensing force having components in a three dimensional space, the first means provides polarized light fluxes to the member for transmission therethrough along respective first, second and third paths. The flux of each path is responsive to stresses in the member along its path and the second means receives and detects respectively the light fluxes transmitted along each of the paths. The third means applies stresses to the member in response to the application to it of force which may be variable and has a magnitude and direction represented by its components along first, second and third vector coordinates of the three dimensional space. The second means provides an output signal which is responsive to each of the components of the force applied to the third means.

The third means of the photoelastic sensing device may have the form of an elongated member providing a control stick, for providing an output signal which is responsive to the magnitude and direction of the force which is applied thereto by manual or other means. In this form, vehicles, aircraft, heavy machinery, games, information input systems, and other such means may be effectively manipulated and controlled, since the output signal may have two or three independent components (depending upon whether the photoelastic device senses force in two or three dimensions), providing a plurality of coordinated signals for achieving the desired control functions.

The photoelastic sensing device can also be adapted for being acted upon by an unknown force which may be variable, to provide an output signal which is representative of the applied force including its direction and magnitude, and the output signal may be utilized as a measure and indication of the unknown force. Thus, the photoelastic sensing device may be used in apparatus for measuring and indicating wind direction, and its magnitude and velocity, or the force, direction and velocity of other fluids. The device may also be utilized as an inclinometer for indicating the orientation of a structure to which it is secured, or as an accelerometer for measuring and indicating rectilinear acceleration of a body. In another form, the photoelastic sensing device may be adapted for indicating the angular position, speed and acceleration of a rotatable body. Of course, in addition to the above adaptations, many other uses and applications of the photoelastic sensing device of the invention will be obvious to those skilled in the art.

DESCRIPTION OF THE DRAWING

The foregoing and other objects of the invention will become more apparent as the following detailed description of the invention is read in conjunction with the drawing, in which:

FIG. 1 is a perspective view of a photoelastic sensing device embodying the invention, FIGS. 2a, 2b and 2c are each a plan view of the photoelastic member of the sensing device of FIG. 1, illustrating different arrangements of the paths for transmitting polarized light fluxes for sensing force having components in a two dimensional space, FIGS. 3a and 3b are exploded perspective views of a portion of the photoelastic member of the device of FIG. 1 diagrammatically illustrating the transmission of polarized light along a path therethrough respectively for applied tensile stress and compressive stress, FIG. 4 graphically illustrates the output voltage as a function of the phase delay between the horizontal and vertical components of the polarized light flux transmitted along a path of the photoelastic sensing device of FIG. 1, FIGS. 5a and 5b are each a plan view of the photoelastic member of the sensing device of FIG. 1 illustrating different arrangements of the paths for transmitting polarized light fluxes for sensing force having components in a three dimensional space, FIG. 8 is a perspective view of another form of the photoelastic sensing device of the invention, which is adapted for measuring and indicating the direction and magnitude of wind velocity, FIG. 9 is a perspective view of still another form of the photoelastic sensing device providing an inclinometer or accelerometer, and FIG. 10 is an elevational view with portions broken away and partially in section, of yet another form of photoelastic sensing device for indicating and measuring the angular position, speed and acceleration of a rotating body.

Like reference numerals designate like parts throughout the several views.

DETAILED DESCRIPTION

Figures 6, 7:
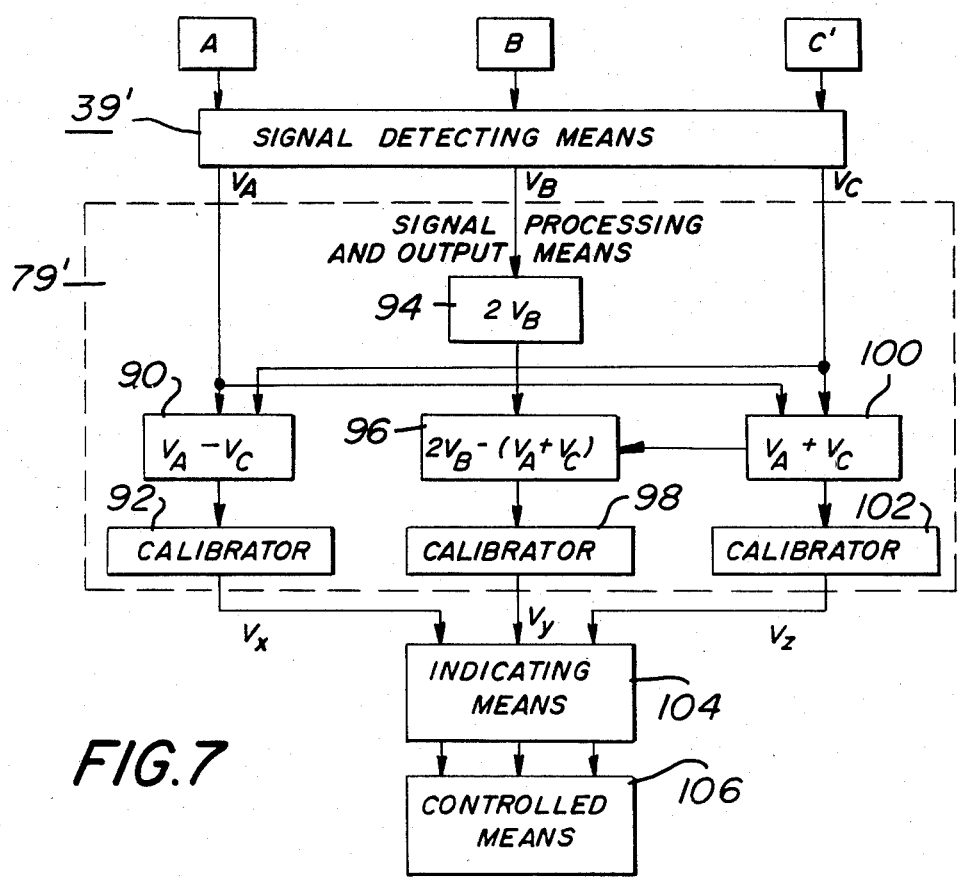
FIG. 6 is a table diagram illustrating the components of the output signal generated by the photoelastic sensing device with the application of a force having components in a three dimensional space with rectangular x, y and z coordinate vector directions.
FIG. 7 is a block diagram of the signal processing means of the photoelastic sensing device which receives the detected signal components derived from the light fluxes transmitted by the photoelastic member, and which provides an output signal to indicating means and controlled means.

Referring to the figures, FIG. 1 illustrates a photoelastic sensing device 10 which embodies the invention. The device 10 comprises a photoelastic member 12 of a transparent photoelastic material, such as glass, with top and bottom surfaces 14 and 16 which may be substantially plane horizontal surfaces, and a peripheral vertical surface 18 joining the top and bottom surfaces 14 and 16. Although other configurations may be utilized, the peripheral surface 18 as shown in FIG. 2a has a rectangular configuration, providing pairs of parallel oppositely spaced sides 20, 22 and 24, 26.

The bottom surface 16 of the photoelastic member 12 is preferably secured with a structure such as the base 28 which is stable or fixed with respect to relative movement of the device 10. The top surface 14 of the member 12 is secured with the bottom end 30 of an elongated body 32 having a top end 34 which may be in the form of a control knob. The elongated body 32, in this form, can provide a control stick to which force F may be applied manually at the knob end 34. The member 12 and the elongated body 32 shown in FIG. 1 may be individual structures which are joined together, or both may be provided by a single unitary structure of photoelastic material. Although the body 32 is shown as having a rectangular cross section conforming with the rectangular form of the member 12, it may have a circular or other desirable cross section which is constant or varies in size and configuration along its length.

The force F applied to the photoelastic device 10 may be in a two or three dimensional space having vector components along the horizontal x and y coordinate axes, and the vertical z coordinate axis. The coordinate axes intersect to provide an origin at the center of the knob end 34 as shown in FIG. 1, with the z axis extending along the axis of the elongated body 32. Thus, if the force F applied to the knob end 34 is in a two dimensional space, it can be represented by vector components in the x and y directions in the x-y plane, by components in the x and z directions in the x-z plane, or by components in the y and z directions in the y-z plane. When a three dimensional force F is applied to the knob end 34 of the member 32, then such force can be represented by its respective components in the x, y and z directions of the three dimensional space.

The application of a force $F_{xy}$ in the x-y plane perpendicular to the z axis of the elongated body 32 as shown in FIG. 1, exerts a torque at its lower end 30. The torque is applied to the top surface 14 of the member 12 producing in the member 12 both compressive and tensile bending stresses in the z direction. The exertion of a force $F_z$ along the axis of the elongated body 32 in the positive z axis direction, produces tensile stresses in the z axis direction throughout the the member 12, while a force $F_z$ in the negative z axis direction correspondingly produces compressive stresses. It is noted, that with the exertion of a force on the knob end 34 which produces a torque on the body 32, the bending stresses produced in the member 12 comprise compressive stresses in one location and tensile stresses in another location of the member 12, with the locations depending upon the direction of the force $F_{xy}$ in the x-y plane.

As shown in FIG. 1, a second set of coordinates is provided having X, Y and Z axes with directions corresponding to those of the x, y and z axes of the first set of coordinates and an origin displaced in the negative direction along the z axis and centered in the photoelastic member 12. The photoelastic member 12 of the sensing means 10 is provided with paths therethrough for the transmission of polarized light fluxes. A first means provides sources 35 of polarized light fluxes to regions of the peripheral surface 18 of the member 12 for transmission along the paths to opposite regions for receipt by a second means comprise detecting means 39 for providing an output signal representative of the force applied to the sensing device 10. Various arrangements of the paths for transmitting light fluxes are illustrated by the several photoelastic members 12a, 12b and 12c respectively of the FIGS. 2a, 2b and 2c.

Considering the arrangement of FIG. 2a, a source 36 of the sources 35 of the first means on the side 20 of the member 12a provides polarized light flux for transmission along path A through the member 12a to the opposite side 22, where it is received by a detecting means 38 of the detecting means 39 of the second means. The path A is along an axis Y' which is displaced parallel to the Y axis. A source 40 of polarized light on the side 24 of the member 12a provides polarized light flux for transmission along a path B through the member 12a to the flux detecting means 42 positioned on the opposite side 26. The path B is along the X' axis which is also displaced parallel to the X axis and is perpendicular to the path A and the Y' axis.

The arrangement of the member 12b shown in FIG. 2b is similar to that of the member 12a of FIG. 2a except that the path B is replaced by the path B' which extends along the X axis. In FIG. 2c, the path A of the member 12c is similar to the paths A of the members 12a and 12b of FIGS. 2a and 2b, but member 12c differs by having a second path C which replaces the second paths B and B'. The path C extends through the member 12c along the Y axis parallel to the path A. A source 44 of light flux on the side 20 of the member 12c provides polarized light flux for the path C, and a detecting means 46 on the side 22 receives the transmitted light flux.

The photoelastic effect produced by the photoelastic material of member 12 in the presence of stress in a direction transverse to the path of the transmitted light flux, results in delaying one component of the transmitted flux with respect to the other and changes the polarization of the transmitted light flux. This photoelastic or "stress birefringence" effect is well known and treated in detail in "Photoelasticity" by Max Mark Frocht, Volume II, Chapter 10, pages 333–337, John Wiley & Sons, Inc. 1948, and in "Principles of Optics," by Max Born and Emil Wolf, Fifth Edition, pages 703–705, Pergamon Press, 1975. The delay produced under stress is a function of the compressive and tensile stresses applied to the member. The tensile stress has an effect which is opposite to that of the compressive stress, and the effects on the polarization of the transmitted light flux is cumulative along the transmission path.

In considering, for example, the effects of the stresses applied along the paths of the member 12a of FIG. 2a the exertion of a force $F_x$ in the positive x axis direction on the end 34 of the device 10, produces bending stresses in the member 12a. The bending stresses comprise compressive stresses $\overline{C}$ in the z axis direction through the member 12a over the region to the right of the Y axis, and tensile stresses $\overline{T}$ over the region to its left. The flux transmitted along the path A, thus, extends entirely through a region subjected to tensile stresses. This results in a modification of the polarization of the light flux received by the detecting means 38. When a force $F_x$ in the negative x axis direction is applied, the regions of tensile and compressive stresses are reversed, so that the flux along the entire path A is subjected to compressive stresses.

With the application of the force $F_x$, the flux transmitted along the path B extends through tensile stresses in the region to the left of the Y axis and through compressive stresses over the remaining half of the path to the right of the Y axis. This produces opposite and equal effects, which cancel out, so that the flux transmitted over the path B is not affected by the force component $F_x$. However, when a force F is applied providing a component $F_y$ along the positive y axis, the flux along the path B is subjected to tensile stresses $\overline{T}$ along its entire length, while flux transmitted along path A is subjected equally to both tensile and compressive stresses. The stresses along the path B affect the polarization of the transmitted flux, while the tensile and compressive stresses along the path A cancel out, resulting in no change in polarization of the flux transmitted along path A. When a force $F_y$ in the negative y axis direction is applied, the regions of the tensile and compressive stresses are reversed providing opposite effects on the transmitted light flux therethrough.

When a force $F_{xy}$ in the x-y plane is applied to the end 34 of the body 32, the force can be resolved into its $F_x$ and $F_y$ components as seen in FIG. 1. Each component has its own effect upon the respective fluxes of the paths A and B. These effects respectively produce changes along the paths A and B which are representative of and respectively correspond to the components $F_x$ and $F_y$ of applied force.

For the member 12b of FIG. 2b, the application of a force component $F_x$ on the end 34 of the body 32, has the same effect on the flux transmitted along the path A as described in connection with the member 12a of FIG. 2a, and also has no effect on the polarization of the flux transmitted along the path B' for the same reasons given in connection with the path B of the member 12a. The application of a force component $F_y$ in the positive y axis direction, places the region of the member 12b above the X axis in compression and the region below the axis X in tension. However, the region along the X axis is unstressed, being neither in tension nor in compression. The flux along the path B', thus, is not affected by the force $F_y$. A force $F_z$ in the positive z axis direction, subjects the entire member 12b to tensile stress transverse to the paths A and B'. This stress results in modifying the polarization of the fluxes transmitted along both of the paths A and B'. It is noted however, that the flux along the path B' is affected only by the force component $F_z$. When the force $F_z$ is in the negative z direction, compressive stress is applied to the entire member 12b, affecting the polarization of flux along the paths A and B' in a manner opposite to that produced by the tensile stress provided by the force component $F_z$ in the positive z direction. The member 12b of FIG. 2b is, thus, responsive to force components in the two dimensional space represented by the x axis and z axis directions.

For the member 12c shown in FIG. 2c, the application of a component of force $F_x$ to the end 34 affects the polarization of flux transmitted along the path A, in the manner described in connection with FIGS. 2a and 2b. Since the path C for transmission of flux lies along the unstressed region of the Y axis between the regions subjected to compressive and tensile stresses, the stresses produced by the force $F_x$ have no effect on the polarization of the light transmitted therealong. The compressive and tensile bending stresses produced by force component $F_y$ also have no net effect on the polarization of the light transmitted along the paths A and C. This is because the effects of the compressive stresses along the paths A and C above the X axis cancel the effect of the tensile stresses along the portions of the paths through the lower half of the member 12c. The application of a force component $F_z$ in either the positive or negative z axis directions, results in corresponding tensile and compressive stress in the member 12c in the z direction along the paths A and C. The stresses thus produced have similar effects on the polarizations of the fluxes transmitted respectively by the paths A and C. It is noted, however, that the flux transmitted along path C is affected only by the force component $F_z$ along the z axis, while the flux transmitted along the path A is affected by both the force component $F_x$ along the x axis direction and the force component $F_z$ along the z axis direction.

Refer to FIGS. 3a and 3b for an explanation in greater detail of the photoelastic or stress birefringence effect on the polarization of light flux transmitted along a path through the member 12, such as the path A of the member 12a of FIG. 2a. As diagrammatically shown in FIG. 3a, the source 36 of light flux may be from a light emitting diode 48 such as the Motorola MF OE 102F IR emitter, providing light flux of a given frequency propagated in the direction of the arrow 49. The light flux passes along the Y' axis and extends through a polarizing plate 50 which may be a sheet of plastic material having optical axes providing polarizing properties. The polarizing plate 50 has its optical axes arranged so that it only passes linearly polarized light flux $P_i$ having a vector direction displaced 45° from the negative horizontal $X_i$ axis and 45° from the vertical Z axis. The light flux $P_i$ has a horizontal component $P_{iX}$ in the negative $X_i$ axis direction and a vertical component $P_{iZ}$ in the Z axis direction. The components $P_{iX}$ and $P_{iZ}$ are respectively parallel to the $X_i$ and Z axes. The linearly polarized light flux $P_i$ next passes through a quarter wave phase delay plate 52 with its optical axes respective aligned with the $X_i$ and Z axes for producing a phase delay between the components of $\pi/2$ radian or 90°. The phase delay plate 52, thus, produces light flux with circular polarization represented by the vector $P_R$ which rotates in the clockwise direction with its end moving along the dashed circle 54 which is delivered for transmission along the path A. In absence of stress along the path A, the circular polarization of the transmitted light flux is unchanged. At the end of the path A, the circularly polarized light passes through an analyzer plate 56 of the detecting means 38 which may also be a sheet of material having optical properties. The analyzer plate 56 has its optical axes arranged in crossed relationship to the optical axes of the polarizing plate 50 and only passes light flux having a direction along the line 58 which is displaced 45° clockwise from the Z' axis. The analyzer plate 56, thus, allows the passage only of light flux $P_o$ which is in the direction 58. The light flux $P_o$ which is passed by the analyzer plate 56 is received by a light detector 60 of the detecting means 38. The light detector 60 may be a detector diode, such as the Motorola MF OD 102F PIN photodiode, which produces an electrical output signal with an amplitude corresponding to the quantity of light flux $P_o$ which it receives. Where desirable, the light flux $P_o$ from the analyzer plate 56 may be transmitted over an optical fiber to a remote location where the detector 60 receives the light flux for providing the electrical output signal. Such as arrangement may be desirable where the installation requires transmission of signals through a hazardous area where the presence of electrical signals is undesirable.

When a tensile stress $\overline{T}$ is applied tranversely along the path A as shown in FIG. 3a, the transmission of the horizontal component $P_{iX}$ of the light flux $P_i$ is delayed with respect to the vertical component $P_{iZ}$. This delay of the $P_{iX}$ component with respect to the $P_{iZ}$ component modifies the circular polarization of the flux $P_R$ to provide the transmitted flux with an elliptical polarization. The elliptically polarized light is represented by a rotating vector $P_e$ illustrated by the dashed line which varies in length by having its end extend to, and move along, the ellipse 62. The length of the vector $P_e$ represents its amplitude as a function of its angular position as it rotates in the clockwise direction. The rotating vector $P_e$ has a maximum amplitude $P_m$ at a clockwise angular displacement of $\theta$ degrees from the vertical Z' axis. The analyzer plate 56 receives the elliptically polarized light flux $P_e$ and passes light flux $P_o$. The light flux $P_o$ has an amplitude which is greater than that of the circularly polarized light flux $P_R$ delivered to the analyzer plate 56 in the absence of stress to the member 12. As the applied tensile stress $\overline{T}$ shown in FIG. 3a increases, the maximum vector $P_m$ also increases and shifts toward the direction of the line 58. This results in increasing values for the flux vector $P_o$ passed by the analyzer plate 56. When the maximum flux vector $P_m$ is aligned with the direction of the line 58, the light flux received by the analyzer plate 56 is linearly polarized in the direction 58. This allows maximum passage of light flux through the analyzer plate 56 by passing all of the transmitted light flux.

When a compressive stress $\overline{C}$ is applied transverse to the path A of the member 12, as illustrated in FIG. 3b, an opposite effect is produced on the light flux $P_R$, so that its component $P_{iX}$ is propagated at a greater speed than its vertical component $P_{iZ}$. This also produces an elliptical polarized light flux $P_e$ at the analyzer plate 56 which has a maximum vector $P'_m$ angularly displaced $\theta'$ degrees in a counter-clockwise direction or to the left of the axis Z'. This results in the light flux $P'_o$ which is passed by the analyzing plate 56 in the direction 58 having an amplitude smaller than that of the light flux $P_o$ produced by the circularly polarized flux $P_R$ in the absence of tensile stress and smaller still than the light flux $P_o$ for the elliptically polarized flux $P_e$ produced by the application of tensile stress to the member 12. The detector 60, accordingly, receives light flux having a smaller amplitude. This results in a correspondingly reduced signal output by the detector 60 responsive to the application of the compressive stress. As the compressive stress $\overline{C}$ increases, the maximum vector $P'_m$ shifts in the counter-clockwise direction shown in FIG. 3b, towards its crossed relationship with the direction 58, further decreasing the light flux $P'_o$ transmitted through the analyzer plate 56.

When the maximum vector $P'_m$ is displaced 90° from the direction 58 and 45° counter-clockwise from the vertical Z' axis, the light flux $P'_m$ is linearly polarized in the crossed direction and has no component $P'_o$ in the direction of the line 58. This results in no light flux being passed through the analyzer plate 56, minimizing the output signal provided by the detector 60.

The curve 66 of FIG. 4 graphically illustrates the variation of amplitude of the voltage output $V_o$ provided by the detector 60 of the detecting means 38 with the application of tensile and compressive forces transverse to a path transmitting light flux through the member 12 illustrated in FIGS. 3a and 3b. In the absence of an applied force to the member 12, a nominal voltage $V_n$ is provided at the point where the curve 66 intersects the horizontal dashed line 72. As tensile stress $\overline{T}$ is applied and increased along the path, the relative phase delay between the horizontal and vertical components $P_{iX}$ and $P_{iZ}$ increases, producing an elliptical polarization with a maximum vector $P_m$ displaced to the right as shown in FIG. 3a. This results in increasing the voltage output $V_o$ of the detector 60, as shown by the positively sloped region 68 of curve 66 above the line 72. The curve 66 increases to a maximum value with increasing tensile force, after which the voltage output $V_o$ decreases as illustrated. With the application of compressive stress $\overline{C}$ along the transmission path of the light flux, the voltage output $V_o$ decreases as shown by the region 70 of the curve 66 below the line 72. The voltage decreases until a minimum value is reached, after which it again increases as shown. The curve 66 for the voltage output $V_o$ is symmetrical about the point $V_n$ and the output $V_o$ is positive for all values along the curve 66. The decrease of voltage output $V_o$ with the application of compressive stress $\overline{C}$ is a result of the greater speed of transmission of the horizontal component $P_{iX}$ of the polarized light with respect to that of the vertical component $P_{iZ}$. Where it is desirable to obtain a linear output signal $V_o$ in response to compressive and tensile forces applied to the member 12, the linear region 77 between the arrow heads on the curve 66 is utilized.

In considering the arrangement of the paths A and B of the photoelastic member 12a of FIG. 2a, the application of a component of force $F_x$ in the positive x axis direction on the end 34 of the elongated body 32 as seen in FIG. 1, produces tensile stress $\overline{T}$ applied transversely along the path A. This results in an voltage output $V_o$ of the detector 60 which is displaced upwardly from the neutral point $V_n$ along the curve 66, while the exertion of a force $F_x$ in the negative x axis direction produces a compressive stress $\overline{C}$ as shown in FIG. 3b, resulting in a decreasing voltage output $V_o$ shown by the portion 70 of the curve 66 below the nominal voltage $V_n$. The exertion of a force $F_y$ along the positive y axis direction on the end 34 of the device 10 as shown in FIG. 1, similarly results in a tensile stress $\overline{T}$ along the path B of the member 12a providing an output $V_o$ which increases above the voltage $V_n$, while a force $F_y$ in the negative y axis direction provides a corresponding decreasing voltage output $V_o$ below the voltage $V_n$ for the path B.

For the arrangement of the photoelastic member 12b shown in FIG. 2b, the path B' is along the center line X axis of the member 12b. The force $F_y$ exerted on the end 34 of the device 10, therefore, has no effect on the output signal $V_o$ of the detecting means 42' which provides the nominal output signal $V_n$. The exertion of the force $F_z$ in the positive and negative directions along the z axis of the device 10 of FIG. 1, results respectively in tensile and compressive stresses exerted on both paths A and B', with the corresponding positive going and negative going voltage output $V_o$ signals. The path A of the member 12c of FIG. 2c, provides a voltage output $V_o$ responsive to the combined applied components of force $F_x$ and $F_z$, and the path C provides an output signal responsive solely to the component of force $F_z$.

The arrangement of a pair of paths for transmission of light fluxes as illustrated by each of the members 12a, 12b, and 12c of the FIGS. 2a, 2b, and 2c, provides an output signal responsive to force in a two dimensional space. None of the arrangements utilizing two paths provides an output signal which is responsive to force in three dimensions as where the force F has components $F_x$, $F_y$, and $F_z$ of a three dimensional space. Arrangements for paths providing an output signal representative of a force in three dimensions are described in connection with the photoelastic members 12d and 12e which are shown in FIGS. 5a and 5b respectively.

FIG. 5a shows a photoelastic member 12d provided with flux transmission paths A and B arranged as in the member 12a in FIG. 2a, and a third path C as provided in the photoelastic member 12c of FIG. 2c. The member 12d has flux sources 37 and detecting means 39' for transmitted flux, the paths A, B and C receiving flux respectively at sources 36, 40 and 44 and delivering flux to detecting means 38, 42 and 46. For this arrangement, a force F with x and y components $F_x$ and $F_y$, provides output signals as described in connection with the photoelastic member 12a of FIG. 2a. The application of a force F with a component $F_z$ in the positive or negative direction along the z axis respectively produces compressive or tensile stresses in the member 12d which stresses are in addition to the stresses resulting from the components $F_x$ and $F_y$, to provide respective output signals by the detecting means 38, 42 and 46 for each of the paths A, B and C. The flux along path C, however, is affected only by the force component $F_z$. Since the effect of the force component $F_z$ on the fluxes of the paths A and B is similar to its effect on the flux of the path C, its effect can be utilized for determining the effects produced solely by the force components $F_x$ and $F_y$ on paths A and B.

The photoelastic member 12e of FIG. 5b has an arrangement of paths which is similar to that of the photoelastic member 12d of FIG. 5a, except that the path C is replaced by the path C' along the Y" axis, displaced to the right of the Y axis. Flux is provided to path C' by source 44' and received by detecting means 46'. This arrangement results in an output signal by the detecting means 46' for the path C', which is opposite going to that produced by the detecting means 38 for the path A. Thus, when a force $F_x$ in the positive x axis direction is applied to the end 34 of the elongated body 32 of the device 10, the applied torque results in a compressive stress along the path C' and a tensile stress along the path A of the member 12e. As the applied force $F_x$ increases, the voltage output Vo provided at the detecting means 38 also increases above the nominal point $V_n$ as shown in FIG. 4, while the voltage output $V_o$ of the detecting means 46' decreases correspondingly. With application of force $F_x$ in the negative x axis direction, opposite effects are obtained, with the voltage output $V_o$ of the detecting means 38 decreasing as compressive stress is applied along the path A, while the voltage output $V_o$ of the detecting means 46' increases with the tensile stress provided along the path C'.

For a description in greater detail of the relationship between the voltage output $V_o$ signals provided by the device 10, for an arrangement of paths A, B and C' as shown in FIG. 5b for the photoelastic member 12e, consider the table of FIG. 6. When a force $F_x$ applied to the end 34 of the device 10 is in the positive x direction, the bottom or lower portion 30 of the elongated body 32 applies bending stresses to the top surface 14 of the member 12e. This results in tensile force $\overline{T}$ being applied along the path A and compressive force along the path C'. The output signal $V_{Ax}$ provided at the detecting means 38 is an increasing voltage illustrated by the rising portion of the curve 80 above the horizontal line 72, while the signal component of the detecting means 46' for the path C' is represented by a decreasing signal $V_{Cx}$ along the curve 82 below the line 72. The output signals of the detecting means 38 and 46', thus, have an equal and opposite variations about the nominal voltage $V_n$. When the force $F_x$ changes from the positive to the negative x direction, the tensile and compressive stresses are reversed. This results in a corresponding reversal in the output signals, the signal $V_{Ax}$ from the detecting means 38 decreasing below the line 72, and the signal $V_{Cx}$ from the detecting means 46' correspondingly increasing above the line 72. Since the force component $F_x$ provides both compressive and tensile stresses along the path B and these effects cancel out, the table in FIG. 6 shows that the force component $F_x$ produces no effect on the signal $V_{Bx}$ of the detecting means 42.

The table of FIG. 6 indicates that for the application of a force component $F_y$ in the positive y direction, the signals $V_{Ay}$ and $V_{Cy}$ of detecting means 38 and 46' for the paths A and C' are not affected. The force $F_y$ only affects the transmitted light flux of path B. For an increasing force $F_y$ in the positive y axis direction the tensile stresses produced result in a signal $V_{By}$ with increasing values along the curve 84 above the neutral line 72, and for the force $F_y$ applied in the negative y direction producing compressive stresses providing decreasing values below the neutral line 72. For an increasing force component $F_z$ in the positive z axis direction which produces tensile stress in the photoelastic member 12e, the detectors 38, 42 and 46' produce signals for the paths A, B and C' which are increasing voltages $V_{Az}$, $V_{Bz}$ and $V_{Cz}$ along their respective curves 86, 87 and 88 above the line 72. For compressive stress applied by the force component $F_z$ in the negative z direction, the detecting means 38, 42 and 46' provide respective signals $V_{Az}$, $V_{Bz}$ and $V_{Cz}$ which decrease along their respective curves 86, 87 and 88 below the line 72 as also represented in the table of FIG. 6.

When a force F, having components $F_x$, $F_y$ and $F_z$ in a three dimensional x, y, z space, is applied to the end 34 of the device 10, the qualitative effects of each of the components of the force on the flux transmitted along each of the paths A, B and C' are provided by the table of FIG. 6. Thus, for the path A, from a consideration of the column under the heading A, it is seen that the flux of path A is affected by the force components $F_x$ and $F_z$, but not by the force component $F_y$. Therefore, the composite output voltage $V_A$ of the detecting means 38 is the sum of the voltage output components $V_{Ax}$ and $V_{Az}$ produced along the linear curves 80 and 86 shown in FIG. 6. From the column under the heading B for the path B, it is seen that the voltage output $V_B$ of the detector 42 comprises the sum of the components $V_{By}$ and $V_{Bz}$ produced by the force components $F_y$ and $F_z$. The force component $F_x$ has no effect on the voltage output $V_B$ of the detecting means 42. Similarly, from the under the heading C' for path C', the voltage output $V_C$ is the sum of the voltage output components $V_{Cx}$ and $V_{Cz}$ produced in response to the force components $F_x$ and $F_z$, with the force $F_y$ providing no contribution.

In summary, the table of FIG. 6 shows that the voltage output $V_A$ derived by the detecting means 38 from the modified light flux transmitted along the path A comprises the sum of the effects or signal components in the column under heading A produced by the components $F_x$ and $F_z$ of the applied force. The addition of the signal components in the columns under the headings B and C, respectively, likewise provide corresponding voltage outputs $V_B$ and $V_C$. These voltage outputs may be expressed as follows:

$$V_A = V_{Ax} + V_{Az} \quad (1)$$

$$V_B = V_{By} + V_{Bz} \quad (2)$$

$$V_C = V_{Cx} + V_{Cz} \quad (3)$$

The table of FIG. 6 also shows the following relationships between components of the applied force and the voltage outputs produced:

$$V_{Ax} = -V_{Cx} = \alpha F_x \quad (4)$$

$$V_{By} = \beta F_y \quad (5)$$

$$V_{Az} = V_{Bz} = V_{Cz} = \delta F_z \quad (6)$$

where $\alpha$, $\beta$ and $\delta$ are constants of proportionality. The substitution of these relationships in the equations (1), (2) and (3) yields $$V_A = \alpha F_x + \delta F_z \quad (7)$$

$$V_B = \beta F_y + \delta F_z \quad (8)$$

$$V_C = \alpha F_x + \delta F_z \quad (9)$$

Solving equations (7), (8) and (9) simultaneously for the components $F_x$, $F_y$ and $F_z$ of the force F in terms of the voltage outputs $V_A$, $V_B$ and $V_C$ yields $$F_x = \frac{V_A - V_C}{2\alpha} = V_x \quad (10)$$

$$F_y = \frac{2V_B - (V_A + V_C)}{2\beta} = V_y \quad (11)$$

$$F_z = \frac{V_A + V_C}{2\delta} = V_z \quad (12)$$

As indicated above, the force components $F_x$, $F_y$ and $F_z$ can be represented by the voltage signals $V_x$, $V_y$ and $V_z$. The voltage signals $V_x$, $V_y$ and $V_z$ are the components of an output signal V which is representative of the force applied to the sensing device 10. The signal V provides a measure and indication of the applied force F, and is responsive to the magnitude and direction of the applied force for providing control means.

In order to derive the output signal V, as shown in FIG. 1, a signal processing and output means 79, which may also provide energization to the light flux sources, derives detected signals from the detecting means 39 of the member 12 over a plurality of lines 78 for producing the output signal V. The output signal V comprising the voltage signals $V_x$ and $V_y$ delivered by the means 39 is produced from the voltage outputs $V_A$ and $V_B$ associated with the paths A and B received over the lines 78 from the detecting means 39. The output signal V when comprising voltage signals $V_x$, $V_y$ and $V_z$ is correspondingly produced from voltage outputs $V_A$, $V_B$ and $V_C$ provided by the utilization of paths A, B and C. Where desirable, as noted previously, the output lines 78 may be optic fibers each transmitting light flux passed by a respective analyzer plate 56 of an associated path to a detector 60 which may be located within the signal processing and output means 79 at a remote location.

Refer to FIG. 7 for a description in greater detail of signal processing and output means 79', which for example, derives the detected signals or voltage outputs $V_A$, $V_B$, and $V_C$ from the photoelastic member 12e of FIG. 5b. The detected signals are responsive to applied force having components $F_x$, $F_y$, $F_z$ in a three dimensional space and are provided by the light fluxes which are transmitted over the paths A, B and C' and modified by the photoelastic effect resulting from the tensile and compressive stresses exerted on the member 12e. The light fluxes from the paths A, B and C', represented by the blocks in FIG. 7, are received by respective signal detectors represented by the signal detecting means 39'. The signal detecting means 39' provides respective voltage outputs or signals $V_A$, $V_B$, and $V_C$ corresponding to the polarizations of the received light fluxes. The signals $V_A$, $V_B$, and $V_C$, which may be in analog form or converted to digital form, are delivered for further processing to the signal processing and output means 79'.

The signals $V_A$ and $V_C$ are received by an adder 90 of the means 79' which substracts the signal $V_C$ from the signal $V_A$ and provides the difference signal $(V_A - V_B)$ to a calibrator 92. The calibrator 92 divides the difference signal $(V_A - V_C)$ by the constant value $2\alpha$ to provide the output signal $V_x$ as seen in equation (10). The input signal $V_B$ is received by a multiplier 94 of the means 79' which doubles its value and delivers it to an adder 96. The adder 96 substracts the sum $(V_A + V_C)$ from the signal $2V_B$ received from the multiplier 94 to deliver the difference signal $2V_B - (V_A + V_C)$ to the calibrator 98. A calibrator 98 divides the received signal by the constant value $2\beta$ shown in equation (11), to provide the output signal $V_y$. The signals $V_A$ and $V_C$ are also received by an adder 100 which delivers their sum $(V_A + V_C)$ to a calibrator 102 for division by the constant value $2\delta$ shown in equation (12) for producing the output signal $V_z$. The calibrators 92, 98 and 102 may be used to provide additional processing for converting the signals to other useful forms.

The output signals $V_x$, $V_y$ and $V_z$ provided by the signal processing and output means 79' comprise the components of the output signal V, and correspond to the force components $F_x$, $F_y$ and $F_z$ of the force F applied to the knob end 34 of the elongated body 32 or control stick of the device 10. The components of the signal V may be delivered to an indicating means 104 such as in a oscilloscope or other visual or measuring device for providing an indication of direction and amplitude of the force F applied to the photoelastic sensing device 10. The indicating means 104 may be provided for indicating and measuring force in two or three dimensions depending upon whether the photoelastic sensing means 10 is sensitive to two or three dimensional applied force. The components $V_x$, $V_y$ and $V_z$ of the output signal V, when applied to a controlled means 106 provide a plurality of coordinated control signals for operating various devices in response to the force applied to the knob end 34 of the device 10. In addition to operating and controlling devices including vehicles, aircraft, machinery, games, and information input systems, many other applications will be obvious to those skilled in the art coming within the scope of this invention. Several additional embodiments of the invention are illustrated in FIGS. 8, 9 and 10.

A wind direction and force indicator device 108 illustrated in FIG. 8, is similar to the photoelastic sensing device 10 of FIG. 1, and utilizes the photoelastic member 12a of FIG. 2a. The member 12a has perpendicularly disposed paths A and B which are provided with light fluxes by respective light sources 36' and 40', and has corresponding light flux detecting means for producing signals $V_A$ and $V_B$. The signals $V_A$ and $V_B$ correspond to the components $F_x$ and $F_y$ of the force F applied to the enlarged top portion 110 of the elongated body 32' of the device 108. The amplitudes of the signals $V_A$ and $V_B$ represent the force components $F_x$ and $F_y$ and provide the resultant amplitude as well as the direction of the force F for correspondence with the N, S, E and W geographical directions. The device 108 may also be subjected to various other fluid and liquid forces for measuring and indicating direction and velocity of fluid flow.

FIG. 9 illustrates an inclinometer or accelerometer device 112 having a photoelastic member 114 similar to the member 12a of FIG. 2a. The device 112 differs from the device 10 of FIG. 1, by having its elongated body 116 extending downwardly from the member 114, and the end of the member 114 secured with a body 118 which is to have its inclination measured. The lower end of the body 116 is secured with a weight 120 for exerting gravitational force on the member 114 and producing the output signals $V_A$ and $V_B$. The device 112 may be arranged so that when the body 118 is horizontal, the extending body 116 is at an offset angle of 45° from the vertical direction shown by the dashed line 122. Thus, as the body 118 tilts towards or away from the vertical direction, a corresponding change is provided in the component signals $V_A$ and $V_B$. Since the output signal is two dimensional, the inclinometer measures inclination in two directions. The device 112 may also be utilized as an accelerometer due to the inertial force exerted on the body 118 by the weight 120 with its acceleration. Thus, acceleration in a unilaterial direction also can be measured by the output signal produced.

The photoelastic sensing device 124 shown in FIG. 10 is adapted for measuring angular position, velocity and acceleration of a rotating body 126. The device 124 has a photoelastic member 128 similar to the member 12a of FIG. 2a which is secured with a relatively fixed structure 130. An elongated body 132 extending from the member 128 along a longitudinal axis 133, has a free cylindrical metal end 134. The end 134 is received within the opening 136 of a cup shaped end portion 138 of the rotatable body 126, which is aligned with and rotates about the axis 133. A magnet 140 is secured with the end portion 138 within its cavity 136 for rotation with the body 126 in proximate relationship to the cylindrical outer surfae of the metal end 134. A balancing non-magnetic counter-weight 142 is also secured with the cup 138 within its cavity 136 directly opposite to the magnet 140.

The magnet 140 exerts a magnetic force F on the metal end 134 of the body 132 in a direction towards the magnet 140. This force produces a torque on the elongated body 132 which is transmitted to the member 128. The member 128 produces an output signal V with components $V_A$ and $V_B$ as described in connection with the member 12A of FIG. 2a, for indicating the magnitude and direction of the applied force F. The output signal V of the device 124 indicates the angular direction of the force F of the magnet 140 and the angular position of the body 126. As the body 126 rotates about the axis 133, the output signal V of the device 124 changes to provide a corresponding vector indicator. The vector indicator also shows rotation and the direction of rotation, corresponding to the actual rotation and the direction of rotation of the body 126. The measure of incremental change of position with time or a count of the number of rotations with time, provides the angular velocity of the body 126. The acceleration of the body 126 is also derived from the output signal when processed to give the change in angular velocity as a function of time. An indication of the position, velocity and acceleration of the body 126 from the output signal V of the device 124 is readily obtained from an oscilloscope, while processing means employing counters and timers can be utilized for providing output readings for the desired values.

It will, of course, be understood that the description of the drawings herein contained are illustrative merely of several embodiments of the invention and that various modifications and changes may be made in the structures and methods disclosed without departing from the spirit of the invention.

What is claimed is:

1. A photoelastic sensing device comprising a photoelastic member of transparent material, first means for providing light fluxes to the member for transmission therethrough as polarized light fluxes along respective first and second paths, second means for respectively receiving and detecting the light fluxes transmitted along the first and second paths, the light fluxes respectively transmitted along the first and second paths of the member each being responsive to stresses in the member along its path, and third means for applying stresses to the member in response to the application thereto of force, which force is variable and has a magnitude and a direction represented by its respective components along first and second vector coordinates defining a two dimensional space, the second means providing an output signal which is representative of the force and responsive to each of the components of the force applied to the third means.

2. The sensing device of claim 1 in which the light fluxes respectively transmitted along the paths are responsive to the magnitudes of the components of the applied force which are respectively in the directions of the first and second coordinates, and the second means by its output signal provides control means which is responsive to the magnitude and direction of the applied force.

3. The sensing device of claim 1 in which the light flux transmitted along the first path is responsive to the magnitude of the component of the applied force in the direction of the first coordinate and the light flux transmitted along the second path is responsive to the magnitude of the component of the applied force in the direction of the second coordinate, the first path for transmission of light flux by the member is in a direction transverse to the first coordinate and the second path for the transmission of light flux is in a direction transverse to the second coordinate, and the output signal of the second means is responsive to the magnitude and direction of the applied force.

4. The sensing means of claim 3 in which the first and second coordinates are orthogonal vector coordinates.

5. The sensing device of claim 4 in which the first path for transmission of light flux by the member is in a direction perpendicular to that of the first coordinate and the second path for transmission of light flux is in a direction perpendicular to that of the second coordinate.

6. The sensing device of claim 5 in which the directions of the first and second paths are each perpendicular to the direction of the second coordinate.

7. The sensing device of claim 1 in which the light flux transmitted along the first path is responsive to the magnitude of the component of the applied force in the direction of the first coordinate and the light fluxes transmitted along the first and second paths are responsive in the same sense to the magnitude of the component of force in the direction of the second coordinate, and the output signal of the second means is responsive to the magnitude and direction of the applied force provided by its components.

8. The sensing means of claim 7 in which the directions of the first and second paths for transmission of light fluxes are each transverse to the direction of the first coordinate and to the direction of the second coordinate.

9. The sensing means of claim 8 in which the first and second paths are parallel to each other and have a direction which is perpendicular to the direction of the first coordinate and to the direction of the second coordinate, and the first and second coordinates are orthogonal vector coordinates.

10. The sensing device of claim 1 in which the third means provides bending stresses to the member with the application of a moment of force thereto, the bending stresses comprise compressive and tensile stresses in a direction transverse to the first and second paths for affecting the light fluxes transmitted by the member.

11. The sensing device of claim 10 in which the third means comprises a body having a first end for receiving the applied moment of force, and a second end which is subjected to torque with the application of the moment of force to its first end and which applies the bending stresses to the member.

12. The sensing device of claim 11 in which the body of the third means is elongated and extends along a longitudinal axis, the bending stresses in the member produced by the torque at the second end of the body are in the direction of the longitudinal axis, and the paths for the transmission of light fluxes through the member are transverse in direction to the longitudinal axis of the body and the stresses produced by the body in the member.

13. The sensing device of claim 12 in which the member has a peripheral surface, the first means provides light fluxes to the peripheral surface of the member at respective first regions for the transmission of respective light fluxes along the first and second paths through the member to respective second regions of the peripheral surface, and the second means receives the transmitted light fluxes at the respective second regions of the peripheral surface of the member.

14. The sensing device of claim 13 in which the first means includes polarizing means providing polarized light fluxes having rectangular vector components which are respectively parallel and perpendicular to the direction of the stresses produced in the member, and the second means detects changes in the respective rectangular components of the light fluxes received for providing the output signal.

15. The sensing device of claim 14 in which the member has a rectangular configuration providing the peripheral surface with opposite spaced parallel portions for the first and second regions, the light flux transmitted along the first path is responsive to the magnitude of the component of the force in the direction of the first coordinate and the light flux transmitted along the second path is responsive to the magnitude of the component of the force in the direction of the second coordinate, and the output signal of the second means is responsive to and representative of the magnitude and direction of the applied force provided by its components.

16. The sensing device of claim 15 in which at least one of the paths is displaced from the longitudinal axis toward the peripheral surface of the member, the first path for transmission of light flux by the member is in a direction transverse to the first coordinate and the second path for the transmission of light flux is in a direction transverse to the second coordinate.

17. The sensing device of claim 16 in which the first and second coordinates are orthogonal vector coordinates, and the second means by its output signal provides control means which is responsive to the magnitude and direction of the applied force.

18. The sensing device of claim 17 in which the first path for transmission of light flux by the member is in a direction perpendicular to that of the first coordinate and the second path for the transmission of light flux is in the direction perpendicular to that of the second coordinate.

19. The sensing device of claim 18 in which the directions of the first and second paths are perpendicular to that of the second coordinate.

20. The sensing device of claim 11 in which the first end of the body includes handle means for manually applying force thereto, and the second means by its output signal is responsive to the magnitude and direction of the force applied to the handle of the body.

21. The sensing device of claim 11 in which the first end of the body has an enlarged portion for having applied thereto the force provided by a fluid current, and the output signal of the second means is indicative of the direction and magnitude of the fluid current to which the first end of the body is subjected.

22. The sensing device of claim 11 in which the first end of the body includes a mass for applying gravitational force to the body at its first end and the second end of the body is secured with a movable means, and the output signal of the second means is indicative of the inclination or acceleration of the movable means.

23. The sensing device of claim 11 which includes a unit movably positioned with respect to the first end of the body and having magnetic properties, the first end of the body has at least a portion with magnetic properties for having force exerted thereon by the unit, and the output signal is indicative of the position and movement of the unit with respect to the first end of the body.

24. The sensing device of claim 23 in which the body is elongated and extends along a longitudinal axis, the unit comprises a permanent magnet which rotates about the axis proximate to the first end of the body and the magnet angularly changes its position with the movement of the unit to apply force to the first end of the body in a direction corresponding to its angular position, and the output signal is indicative of the angular position and angular velocity of the unit.

25. The sensing device of claim 1 in which the member has an axial direction transverse its paths, the third means with the application of the force thereto having components along the first coordinate taken in the axial direction and the second coordinate normal thereto provides bending compressive and tensile stresses to the member for the moment of the applied force in the direction normal to the axial direction and axial compressive and tensile stresses for the component of the applied force in the axial direction, the bending stresses provide both compressive and tensile stresses at different locations of the member in the direction transverse to the paths for affecting the light fluxes transmitted by the member, and the axial stresses provide a respective one of the compressive and tensile stresses to the member in a direction transverse to the first and second paths for affecting the light fluxes transmitted by the member.

26. The sensing device of claim 25 in which the third means comprises a body having a first end for receiving the applied force, and a second end which is subjected to torque, compressive and tensile forces with the application of the force to its first end and respectively applies the bending, compressive and tensile stresses to the member.

27. The sensing device of claim 26 in which the body of the third means is elongated and extends along a longitudinal axis in the axial direction of the member, the components of the force applied to the first end of the body in directions normal to the longitudinal axis produce the torque and apply the bending, compressive and tensile stresses to the member in the direction of the longitudinal axis, and the components of the applied force in the direction of the longitudinal axis respectively away from and towards the second end of the body correspondingly provide axial compressive and tensile stresses in the member in the direction of the longitudinal axis, and the paths for the transmission of light fluxes through the member are transverse in direction to the longitudinal axis of the body and the stresses produced in the member.

28. The sensing device of claim 27 in which the member has a peripheral surface, the first means provides light fluxes to the peripheral surface of the member at respective first regions for the transmission of respective light fluxes along the first and second paths through the member to respective second regions of the peripheral surface, and the second means receives the transmitted light fluxes at the respective second regions of the peripheral surface of the member.

29. The sensing device of claim 28 in which the first means includes polarizing means providing polarized light fluxes having rectangular vector components which are respectively parallel and perpendicular to the direction of the stresses produced in the member, and the second means detects changes in the respective rectangular components of the light fluxes received for producing the output signal which provides control means responsive to the magnitude and direction of the applied force.

30. The sensing device of claim 29 in which the member has a rectangular configuration providing the peripheral surface with opposite spaced parallel portions for the first and second regions, the first and second paths are displaced from the longitudinal axis toward the peripheral surface, the light flux transmitted along the first path is responsive to the magnitude of the component of the applied force in the direction of the first coordinate and the light flux transmitted along the second path is responsive to the magnitude of the component of the applied force in the direction of the second coordinate, and the output signal of the second means is responsive to the magnitude and direction of the applied force provided by its components.

31. The sensing device of claim 29 in which the member has a rectangular configuration providing the peripheral surface with opposite spaced parallel portions for the first and second regions, the first and second paths are displaced from the longitudinal axis toward the peripheral surface, the light flux transmitted along the first path is responsive to the magnitude of the component of the applied force in the direction of the first coordinate and the light fluxes transmitted along the first and second paths are responsive in the same sense to the magnitude of the component of the applied force in the direction of the second coordinate, and the output signal of the second means is responsive to the magnitude and direction of the applied force provided by its components.

32. The sensing device of claim 31 in which the first and second paths are parallel to each other and have a direction which is perpendicular to the direction of the first coordinate and to the direction of the second coordinate, and the first and second coordinates are orthogonal vector coordinates.

33. The sensing device of claim 29 in which the first end of the body includes handle means for manually applying force thereto, and the second means by its output signal is responsive to the magnitude and direction of the force applied to the handle of the body.

34. A photoelastic sensing device comprising a photoelastic member of transparent material, first means for providing light fluxes to the member for transmission therethrough as polarized light fluxes along respective first, second and third paths, second means for respectively receiving and detecting the light fluxes transmitted along the first, second and third paths, the light fluxes respectively transmitted along the first, second and third paths of the member each being responsive to stresses in the member along its path, and third means for applying stresses to the member in response to the application thereto of force which is variable and has a magnitude and a direction represented by its respective components along first, second and third vector coordinates defining a three dimensional space, the second means providing an output signal which is responsive to each of the components of the force applied to the third means.

35. The sensing device of claim 34 in which the light fluxes respectively transmitted along the paths in the member are responsive to the magnitudes of the components of the applied force which are respectively in the directions of the first, second and third coordinates, and the second means by its output signal provides control means which is responsive to the magnitude and direction of the applied force.

36. The sensing device of claim 34 in which the light flux transmitted along the first path is responsive to the magnitude of the component of the applied force in the direction of the first coordinate, the light flux transmitted along the second path is responsive to the magnitude of the component of the applied force in the direction of the second coordinate, and the light fluxes transmitted along the second and third paths are responsive to the magnitude of the component of the applied force in the direction of the third coordinate; the first path for transmission of light flux by the member is in a direction transverse to the first coordinate, the second path for the transmission of light flux is in a direction transverse to the second coordinate, and the third path for the transmission of light flux is in a direction transverse to the third coordinate; and the output signal of the second means is responsive to the magnitude and direction of the applied force.

37. The sensing device of claim 36 in which the first, second and third coordinates are orthogonal vector coordinates.

38. The sensing device of claim 37 in which the first path for transmission of light flux by the member is in a direction perpendicular to that of the first coordinate, the second path for transmission of light flux is in a direction perpendicular to that of the second coordinate, and the third path for transmission of light flux is in a direction perpendicular to that of the third coordinate.

39. The sensing device of claim 38 in which the directions of the first, second and third paths are each perpendicular to the direction of the third coordinate, and the second means by its output signal provides control means which is responsive to the magnitude and direction of the applied force.

40. The sensing device of claim 34 in which the light flux transmitted along the first path is responsive to the magnitude of the component of applied force in the direction of the first coordinate, the light fluxes transmitted along the second and third paths are respectively responsive in opposite senses to the magnitude of the component of the applied force in the direction of the second coordinate and are responsive in the same sense to the magnitude of the component of force in the direction of the third coordinate, and the output signal of the second means is responsive to the magnitude and direction of the applied force provided by its components.

41. The sensing device of claim 40 in which the directions of the first, second and third paths for the transmission of light fluxes are respectively transverse to the directions of the first, second and third coordinates.

42. The sensing means of claim 41 in which the second and third paths are parallel to each other and have a direction which is perpendicular to the direction of the second coordinate and to the direction of the third coordinate, and the first, second and third coordinates are orthogonal vector coordinates.

43. The sensing device of claim 34 in which the third means with the application of the force thereto provides bending, compressive and tensile stresses to the member for the moment of the force and axial compressive and tensile stresses for the axial component of the force, the bending stresses provide both compressive and tensile stresses at different locations of the member in the direction transverse to the paths for affecting the light fluxes transmitted by the member, the axial stresses provide a respective one of the compressive and tensile stresses to the member in a direction transverse to the first and second paths for affecting the light fluxes transmitted by the member.

44. The sensing device of claim 43 in which the third means comprises a body having a first end for receiving the applied force, and a second end which is subjected to torque, compressive and tensile forces with the application of the force to its first end and respectively applies the bending, compressive and tensile stresses to the member, and the second means by its output signal provides control means which is responsive to the magnitude and direction of the applied force.

45. The sensing device of claim 43 in which the third means comprises a body which is elongated and extends along a longitudinal axis having a first end for receiving the applied force and a second end, the components of the force applied to the first end of the body in directions normal to the longitudinal axis produce torque at the second end and apply the bending, compressive and tensile stresses to the member in the direction of the longitudinal axis, and the components of the force applied to the first end of the body in the direction of the longitudinal axis respectively away from and towards the second end of the body correspondingly provide axial compressive and tensile stresses in the member in the direction of the longitudinal axis, and the paths for the transmission of light fluxes through the member are transverse in direction to the longitudinal axis of the body and the stresses produced in the member, and the output signal of the second means is responsive to and representative of the magnitude and direction of the applied force.

46. The sensing device of claim 45 in which the member has a peripheral surface, the first means provides light fluxes to the peripheral surface of the member at respective first regions for transmission of respective light fluxes along the first, second and third paths through the member to respective second regions of the peripheral surface, and the second means receives the transmitted light fluxes at the respective second regions of the peripheral surface of the member.

47. The sensing device of claim 46 in which the first means includes polarizing means providing polarized light fluxes having rectangular vector components which are respectively parallel and perpendicular to the direction of the stresses produced in the member, and the second means detects changes in the respective rectangular components of the light fluxes received for providing the output signal.

48. The sensing device of claim 47 in which the member has a rectangular configuration providing the peripheral surface with opposite spaced parallel portions for the first and second regions, the first and second paths are positioned on opposite sides of and are displaced from the longitudinal axis toward the peripheral surface, the light flux transmitted along the first path is responsive to the magnitude of the component of the applied force in the direction of the first coordinate, the light flux transmitted along the second path is responsive to the magnitude of the component of the applied force in the direction of the second coordinate and the light flux transmitted along the third path is responsive to the magnitude of the component of the applied force in the direction of the third coordinate, and the output signal of the second means is responsive to the direction and magnitude of the applied force provided by its components.

49. The sensing device of claim 47 in which the member has a rectangular configuration providing the peripheral surface with opposite spaced parallel portions for the first and second regions, the first and second paths are positioned on opposite sides of and are displaced from the longitudinal axis toward the peripheral surface, the light flux transmitted along the first path is responsive to the magnitude of the component of the applied force in the direction of the first coordinate, the light fluxes transmitted along the second and third paths are respectively responsive in opposite senses to the magnitude of the component of the applied force in the direction of the second coordinate and are responsive in the same sense to the magnitude of the component of the applied force in the direction of the third coordinate, and the output signal of the second means is responsive to the direction and magnitude of the applied force provided by its components.

50. The sensing device of claim 49 in which the second and third paths are parallel to each other and have a direction which is perpendicular to the direction of the second coordinate and to the direction of the third coordinate, the first, second and third coordinates are orthogonal vector coordinates, and the second means by its output signal provides control means which is responsive to the magnitude and direction of the applied force.

51. The sensing device of claim 45 in which the first end of the body includes handle means for manually applying force thereto, and the second means by its output signal is responsive to the magnitude and direction of the force applied to the handle of the body.

* * * * *

UNITED STATES PATENT AND TRADEMARK OFFICE
CERTIFICATE OF CORRECTION

PATENT NO. : 4,498,348
DATED : February 12, 1985
INVENTOR(S) : Laurence N. Wesson It is certified that error appears in the above-identified patent and that said Letters Patent is hereby corrected as shown below:

Column 12, line 15, after "force" insert -- $\bar{C}$ -- .

Column 13, line 7, before "under" insert --column--.

Signed and Sealed this

Twenty-ninth Day of April 1986

[SEAL]

Attest:

DONALD J. QUIGG

Attesting Officer

Commissioner of Patents and Trademarks